Aug. 21, 1923.
S. H. NORTON
SLOTTING TOOL
Filed July 14, 1921
1,465,282
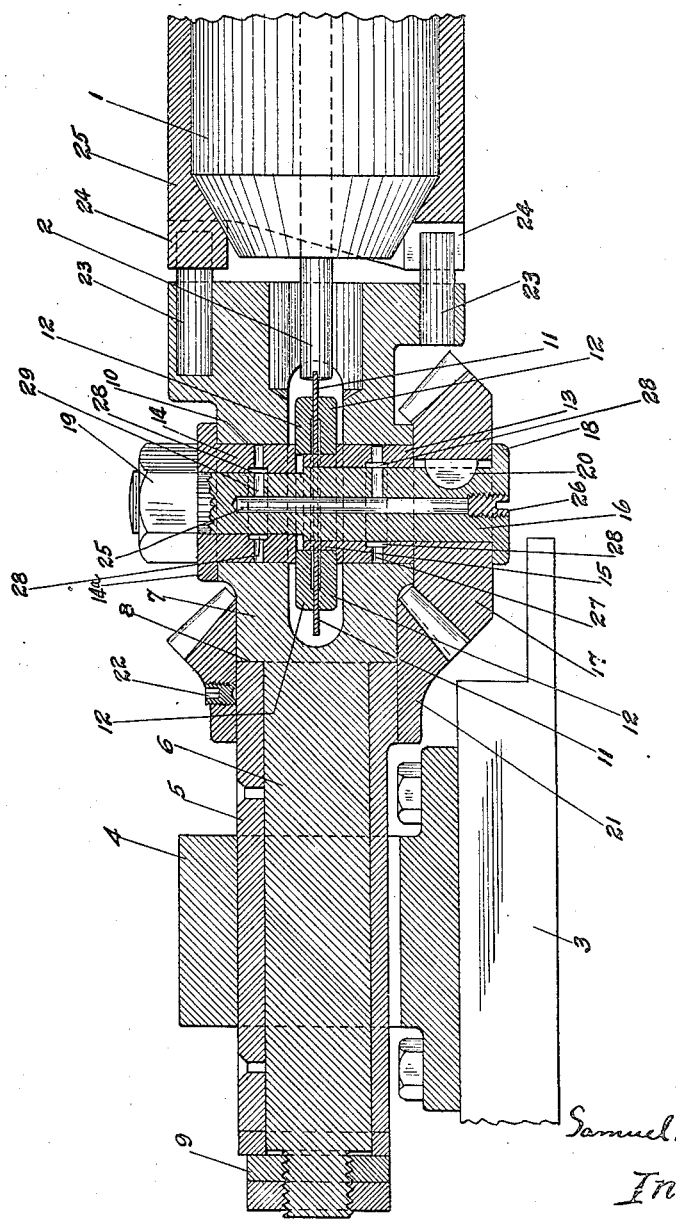
Samuel H. Norton
Inventor.
By
Attorney.

Patented Aug. 21, 1923.

1,465,282

UNITED STATES PATENT OFFICE.

SAMUEL H. NORTON, OF MEADVILLE, PENNSYLVANIA, ASSIGNOR TO McCROSKY TOOL CORPORATION, OF MEADVILLE, PENNSYLVANIA, A CORPORATION OF PENNSYLVANIA.

SLOTTING TOOL.

Application filed July 14, 1921. Serial No. 484,576.

*To all whom it may concern:*

Be it known that I, SAMUEL H. NORTON, a citizen of the United States, residing at Meadville, in the county of Crawford and State of Pennsylvania, have invented new and useful Improvements in Slotting Tools, of which the following is a specification.

This tool is designed to slot rods in an ordinary automatic machine such as an automatic screw machine.

The invention is illustrated in the accompanying drawing which shows a central vertical section through the device, the section being from the side of the ordinary machine.

1 marks the spindle nose of an automatic machine, 2 a rod held thereby, and 3 the ordinary sliding mounting for the usual holder 4 of an automatic machine. The sleeve 5 is fixed in the holder 4 and carries a shaft 6 which is journaled in the sleeve 5. A head 7 is formed on the end of the shaft 6, the head forming a shoulder 8 abutting against the end of the sleeve 5 and the shaft being held in place by a nut 9.

The head 7 is provided with a transverse bearing 10. A cutter 11 is secured between the clamping washers 12. These washers are held between the spindles 13 and 14, the spindle 13 having an extension 15 extending through the washers 12 and cutter 11 so as to center them. A bolt 16 extends through a bevelled gear 17 and through the sleeves 13 and 14. The bolt is provided with a head 18 acting on the gear 17 at one end and with the nut 18 at the opposite end. It will readily be seen that as the nut 19 is set up all parts of the spindle are clamped together, the cutter being securely clamped between the clamping washers 12. The spindle sleeve 14 is provided with a head 14ª and this in connection with the gear 17 locks the spindle against endwise movement in the bearing. The parts are so arranged as to size as to prevent the clamping of the head 14ª and the gear 17 against the faces of the head. The gear 17 is locked with the bolt 16 by means of a key 20.

A gear 21 is fixed on the sleeve 5 by means of a set screw 22 and as the sleeve 5 is fixed on the holder 4 the gear 21 is locked against rotation.

Clutch pins 23 extend from the working face of the head 7 and engage the clutch surfaces 24 on a clutch ring 25, the clutch ring being fixed on the work spindle or nose 1.

In order to lubricate the bearing 10 I provide an axial opening 25 extending into the bolt 16. A cap screw 26 provides a means by which it may be opened for the introduction of oil. Radial openings 27 extend through the sleeve spindles 13 and 14 from annular grooves 28. The annular grooves register with radial openings 29 in the bolt 16 leading from the axial opening 25.

The operation of the device is as follows: The work 2 is secured in the rotating nose and the head 7 is advanced in the usual manner by moving the sliding mounting 3. As the pins 23 engage the clutch surfaces 24 the head is forced to rotate with the work spindle. The rotation of the head 7 gives to the bevelled gear 17 a planetary movement and as it is in mesh with the stationary gear 21 it is rotated on its axis giving to the cutter spindle a rotative movement. Inasmuch as the head and work spindle are locked together by the detent clutch, the rod, or work 2 and the cutter are held against rotation relatively to each other so that as the head is advanced the cutter forms a slot in the end of the rod.

What I claim as new is:—

In a slotting tool, the combination of a cutter head having a transverse bearing therein; sleeve spindles arranged in the bearing; clamping plates between the sleeve spindles; a cutter carried by the clamping plates; a bolt extending through the sleeve spindles and clamping the spindles and cutter together; a gear carried by the bolt; and a stationary gear meshing with the first mentioned gear.

In testimony whereof I have hereunto set my hand.

SAMUEL H. NORTON.